United States Patent
Schei et al.

(10) Patent No.: US 9,438,728 B2
(45) Date of Patent: Sep. 6, 2016

(54) TELEPHONE NUMBER GROUPING SERVICE FOR TELEPHONE SERVICE PROVIDERS

(71) Applicant: MYA NUMBER CORP., Bainbridge Island, WA (US)

(72) Inventors: Kyle M. Schei, Bainbridge Island, WA (US); John T. Wantz, II, Ferndale, WA (US)

(73) Assignee: MYA NUMBER CORP., Bainbridge Island, WA (US)

( * ) Notice: Subject to any disclaimer, the term of this patent is extended or adjusted under 35 U.S.C. 154(b) by 0 days.

(21) Appl. No.: 14/525,039

(22) Filed: Oct. 27, 2014

(65) Prior Publication Data

US 2016/0119469 A1   Apr. 28, 2016

(51) Int. Cl.
H04M 3/42   (2006.01)

(52) U.S. Cl.
CPC ....... *H04M 3/4228* (2013.01); *H04M 3/42212* (2013.01)

(58) Field of Classification Search
None
See application file for complete search history.

(56) References Cited

U.S. PATENT DOCUMENTS

| | | |
|---|---|---|
| 5,454,032 A | 9/1995 | Pinard et al. |
| 5,920,815 A | 7/1999 | Akhavan |
| 6,097,802 A | 8/2000 | Fleischer et al. |
| 6,259,782 B1 | 7/2001 | Gallant |
| 6,304,649 B1 | 10/2001 | Lauzon et al. |
| 6,445,694 B1 | 9/2002 | Swartz |
| 6,449,483 B1 | 9/2002 | Akhteruzzaman et al. |
| 6,496,578 B1 | 12/2002 | Chen et al. |
| 6,571,100 B1 | 5/2003 | Lautenschlager |
| 6,574,470 B1 | 6/2003 | Chow et al. |
| 6,584,317 B2 | 6/2003 | Mukerjee et al. |
| 6,600,819 B1 | 7/2003 | Catley et al. |
| 6,795,532 B1 | 9/2004 | Gross et al. |
| 6,970,474 B1 | 11/2005 | Sinha |
| 6,999,757 B2 | 2/2006 | Bates et al. |

(Continued)

FOREIGN PATENT DOCUMENTS

| | | |
|---|---|---|
| GB | 2381405 A | 4/2003 |
| GB | 2499732 A | 8/2013 |
| WO | 2013128178 A1 | 9/2013 |

OTHER PUBLICATIONS

About Google Voice [online]. Google.com, Jan. 2014 [retrieved on Jan. 31, 2014]. Retrieved from the Internet: <URL: https://support.google.com/voice/answer/115061?hl=en>, 2 pages.

(Continued)

*Primary Examiner* — Harry S Hong
(74) *Attorney, Agent, or Firm* — Kilpatrick Townsend & Stockton LLP

(57) ABSTRACT

An existing telephone service provider network may be adapted to associate a single telephone number with multiple telephone service user devices. The multiple provisioned telephone numbers may be grouped such that service activity originating from a device associated with one of the grouped telephone numbers appears to originate from a selected (and possibly different) one of the grouped telephone numbers, and such that service activity destined for a device associated with one of the grouped telephone numbers may be forwarded to one or more and/or each of the devices associated with the grouped telephone numbers. Any suitable set of provisioned telephone numbers may be grouped including, but not limited to, a set of two provisioned telephone numbers.

20 Claims, 8 Drawing Sheets

(56) References Cited

U.S. PATENT DOCUMENTS

| | | | |
|---|---|---|---|
| 7,099,445 | B2 | 8/2006 | Creamer et al. |
| 7,127,239 | B2 | 10/2006 | Ogman et al. |
| 7,155,226 | B1 | 12/2006 | Oh et al. |
| 7,164,666 | B2 | 1/2007 | Bunn et al. |
| 7,277,735 | B1 | 10/2007 | Oh et al. |
| 7,319,864 | B2 | 1/2008 | Jagadeesan et al. |
| 7,486,649 | B2 | 2/2009 | Marsico et al. |
| 7,529,358 | B2 | 5/2009 | Tankhiwale |
| 7,657,270 | B2 | 2/2010 | Hicks et al. |
| 7,957,518 | B2 | 6/2011 | Erb |
| 8,019,327 | B2 | 9/2011 | Dennert et al. |
| 8,085,924 | B2 | 12/2011 | Shaffer et al. |
| 8,135,121 | B2 | 3/2012 | Forte |
| 8,374,169 | B2 | 2/2013 | Gray et al. |
| 8,396,460 | B2 | 3/2013 | Couse |
| 8,406,749 | B1 | 3/2013 | Gunasekara et al. |
| 8,423,629 | B2 | 4/2013 | Brunson et al. |
| 8,611,511 | B2 | 12/2013 | Mclarty et al. |
| 2009/0034707 | A1* | 2/2009 | Li .......................... H04W 8/06 379/207.02 |
| 2010/0099390 | A1* | 4/2010 | Vendrow et al. .......... 455/414.1 |
| 2010/0311416 | A1 | 12/2010 | Abichandani et al. |
| 2011/0106902 | A1 | 5/2011 | Jagoe et al. |
| 2012/0243444 | A1 | 9/2012 | Hillier et al. |
| 2012/0323703 | A1 | 12/2012 | Hillier |
| 2013/0223432 | A1 | 8/2013 | Cook |
| 2013/0225135 | A1 | 8/2013 | Cook et al. |
| 2013/0242775 | A1 | 9/2013 | Taylor |
| 2014/0044249 | A1 | 2/2014 | Brittain |

OTHER PUBLICATIONS

Big enterprise features at a small business price [online]. Phonebooth.com, Jan. 2014 [retrieved on Jan. 31, 2014] Retrieved from the Internet <URL: http://www.phonebooth.com/business-system-features>, 2 pages.

Business Communication Simplified. Free phone lines. Bulk SMS. Calls and voicemail [online]. SendHub.com, Jan. 2014 [retrieved on Jan. 31, 2014]. Retrieved from the Internet <URL: https://www.sendhub.com/>, 3 pages.

Cloud Phone System: Finally, a Smart Cloud-Based Phone System—Cloud-Based Flexibility and Service Beyond the Dial Tone [online]. ShorTelSky.com, Jan. 2014 [retrieved on Jan. 31, 2014]. Retrieved from the Internet <URL: http://www.shoretelsky.com/products/cloud-phone-system/>, 7 pages.

Del Monte, Bryan. "What is Mobile Twinning?" [online] McEnroeVoice.com, Dec. 2013 [retrieved on Dec. 29, 2014]. Retrieved from the Internet: <URL: http://www.mcenroevoice.com/business-phone-system/what-is-mobile-twinning/>, 2 pages.

Get a group phone No. [online]. 3Jam.com, Jan. 2014 [retrieved on Jan. 31, 2014]. Retrieved from the Internet: <URL: http://www.3jam.com/group-phone-number.php>, 1 page.

Liscano, et al. "Software Agents for Enhancing Messaging in a Universal Personal Numbering Service." Intelligent agents for Telecommunication Applications : Third International Workshop. Proceedings / IATA '99, Stockholm, Sweden, 1999, pp. 161-174.

Mobile Extension: Quick Reference. [online] Mitel.com, 2007 [retrieved on Jan. 31, 2014]. Retrieved from the Internet <URL: http://edocs.mitel.com/ http://edocs.mitel.com/UG/EN/ME_R1.5_QRG.pdf>, 2 pages.

Mobile Twinning Quick Reference Guide [online]. Avaya, Jun. 2006 [retrieved on Jan. 31, 2014]. Retrieved from the Internet <URL: http://www.ipofficeinfo.com/docs/mobile_twinning_qrg.pdf>, 2 pages.

Needleman, Rafe. BT's Ribbit releasing Google Voice competitor: The new telephony service for consumers promises to heat up the phone-number-in-the-cloud battle [online]. CNet.com, Nov. 3, 2009 [retrieved on Jan. 31, 2014]. Retrieved from the Internet <URL: http://news.cnet.com/8301-19882_3-10388968-250.html>, 5 pages.

* cited by examiner

TELEPHONE NUMBER GROUPING SERVICE FOR TELEPHONE SERVICE PROVIDERS

TECHNICAL FIELD

This invention pertains generally to telecommunications and, more particularly, to telecommunications that uses telephone numbers.

BACKGROUND

Mobile telephones have become a common part of work and play, enabling convenient real-time and message-style communications between billions of people. As they developed, mobile telephone systems typically extended fixed or landline telephone systems, with a unifying element being a telephone number that conceptually corresponds to a particular telephone. As mobile telephones have become dominant in the marketplace, the traditional association between particular telephone numbers and particular physical locations has weakened, while the association between particular telephone numbers and particular people has strengthened. Mobile telephones have become lightweight and capable of being carried or in close proximity for much of the time. It can even feel odd to call a telephone number and have the call answered by someone other than a particular person associated with the telephone number.

In addition, the variety of mobile communication devices has exploded. From smart phones to wearables, telephone numbers are being associated with more and more non-traditional devices. In particular, it is becoming more common for a person to possess and operate multiple mobile communication devices, each with features and shortcomings, and each with its own associated telephone number. However, this situation introduces the confusion of multiple telephone numbers associated with a person, and the frustration that the person may not have all of the multiple devices in close proximity all the time.

Conventional attempts to address such frustrations, confusions and complexities are inefficient, ineffective and/or have undesirable side effects or other drawbacks with respect to at least one significant use case. For example, some conventional approaches are poorly integrated with telephone service provider infrastructure.

Embodiments of the invention are directed toward solving these and other problems individually and collectively.

BRIEF DESCRIPTION OF THE DRAWINGS

Illustrative embodiments of the present invention are described in detail below with reference to the following drawing figures.

Note that the same numbers are used throughout the disclosure and figures to reference like components and features.

DETAILED DESCRIPTION

Figure 1:
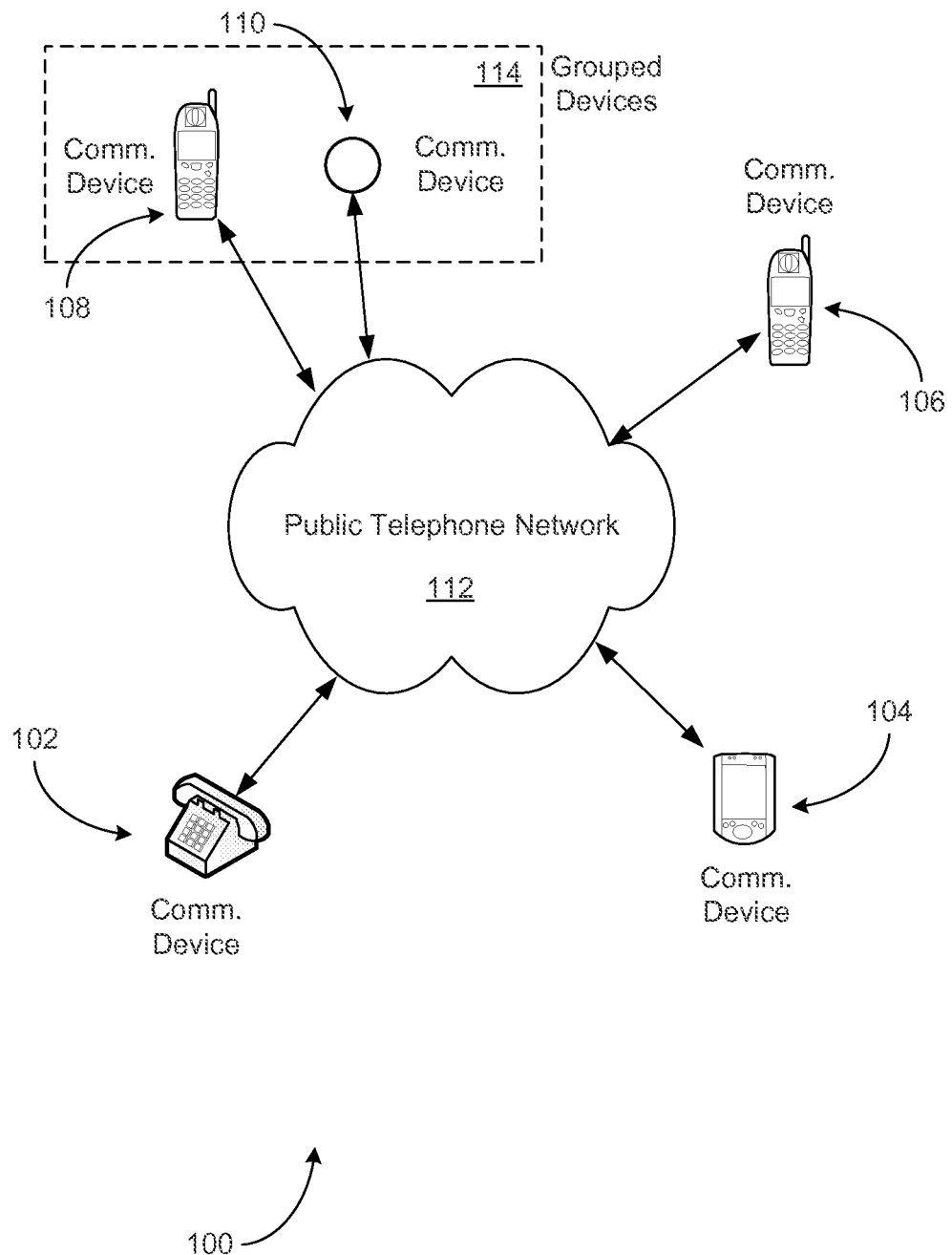
FIG. 1 is a schematic diagram depicting aspects of an example telecommunications environment in accordance with at least one embodiment of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, a telephone number grouping service may be provided for telephone service providers. An existing telephone service provider network may provide telephone service to a variety of communication devices associated with telephone numbers ("telephone service user devices") including landline telephones and wireless cellular telephones. The existing telephone service provider network may be adapted to associate a single telephone number with multiple telephone numbers and/or multiple telephone service user devices.

In accordance with at least one embodiment of the invention, a telephone service provider may provision telephone numbers for multiple telephone service user devices. For example, such provisioning may include associating particular telephone numbers with particular subscriber identity module (SIM) of a wireless cellular telephone. The multiple provisioned telephone numbers may be grouped such that service activity originating from a device associated with one of the grouped telephone numbers ("outgoing activity") appears to originate from a selected (and possibly different) one of the grouped telephone numbers, and such that service activity destined for a device associated with one of the grouped telephone numbers ("incoming activity") may be forwarded to one or more and/or each of the devices associated with the grouped telephone numbers. For example, incoming telephone calls may be forked to multiple devices and outgoing telephone calls may be masked so as to appear to originate from a selected and/or primary one of the grouped telephone numbers. In accordance with at least one embodiment of the invention, a new telephone number may be provisioned and grouped with other telephone numbers to act as the primary telephone number for the group. Any suitable set of provisioned telephone numbers may be grouped including, but not limited to, a set of two provisioned telephone numbers.

In accordance with at least one embodiment of the invention, provisioned telephone numbers may be grouped in a registration phase. For example, the registration phase may be facilitated with a graphical user interface such as a smart phone "app" or web site. A grouping service may intercept telephone service activity associated with registered telephone numbers. For example, the telephone service provider may at least partially delegate telephone service control to the grouping service. The grouping service may process intercepted telephone service activity in accordance with one or more configured service activity processing policies, and may yield service activity control on detection of emergency situations and/or conditions (e.g., a "911" call). The grouping service may be implemented with one or more components including one or more components located in a telephone service provider network (e.g., by a telecommunications switch), one or more components independent of telephone service provider networks (e.g., at "cloud" hosted servers), and/or one or more components on a telephone service user device (e.g., smart phone apps and/or lower-level telephone network functionality).

Having introduced some salient concepts, the description now turns to the figures. FIG. 1 depicts aspects of an example telecommunications environment 100 in accordance with at least one embodiment of the invention. In the example telecommunications environment 100, multiple telephone service user devices 102, 104, 106, 108, 110 are connected by a public telephone network 112 operated by one or more telephone service providers (not shown in FIG. 1). For example, telephone service user devices may include a landline telephone 102, a wireless cellular telephone 106, a smart phone 104, a wearable communications device 110 and any suitable communications device capable of participating in the public telephone network 112. In the example depicted in FIG. 1, a mobile telephone 108 and the wearable communications device 110 have been configured as grouped devices 114 in accordance with at least one embodiment of the invention.

Figure 2:
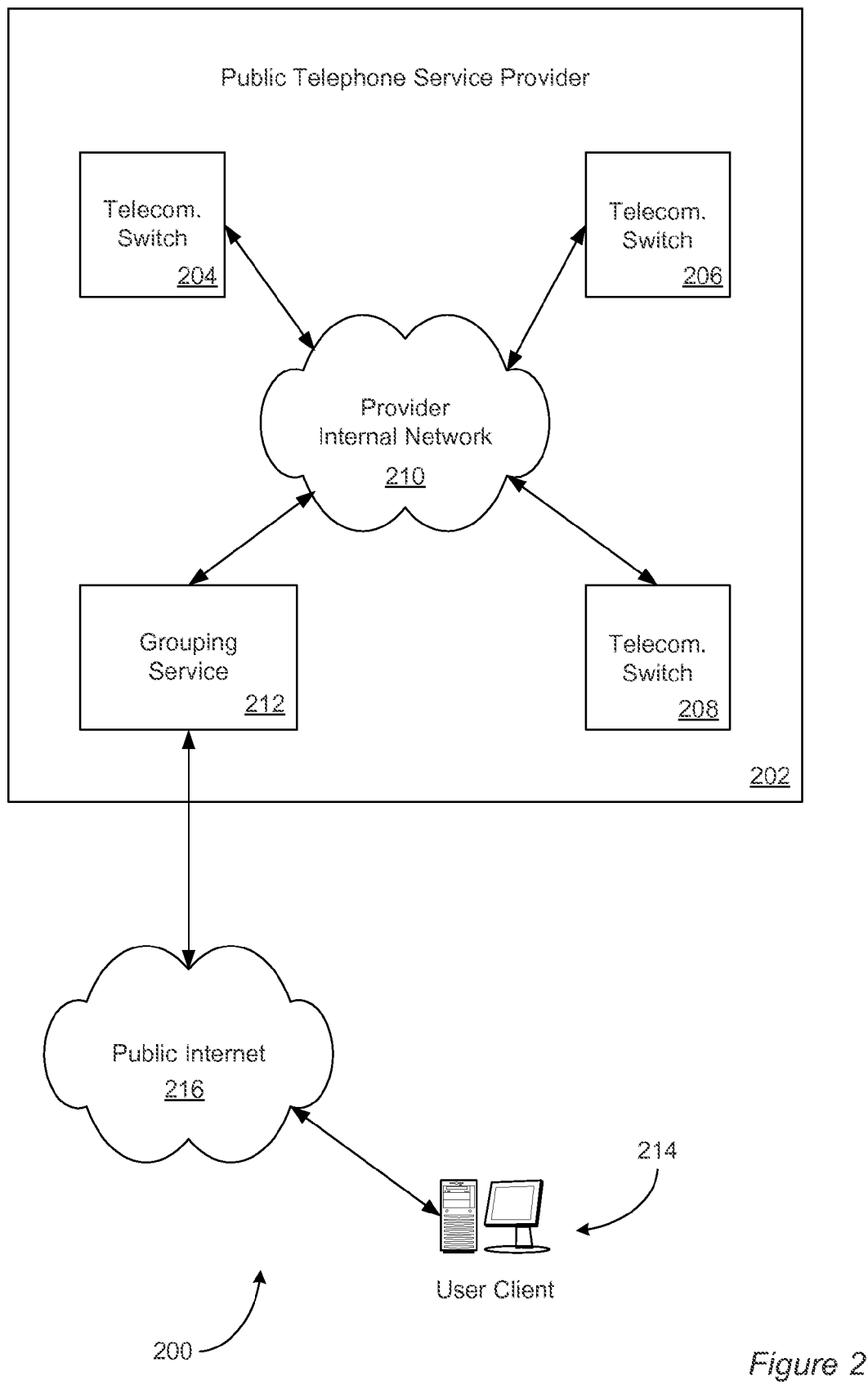
FIG. 2 is a schematic diagram depicting aspects of an example system architecture in accordance with at least one embodiment of the invention.

FIG. 2 depicts aspects of an example system architecture 200 in accordance with at least one embodiment of the invention. The example system architecture 200 includes a public telephone service provider 202 operating multiple telecommunication switches 204, 206, 208 connected by an internal network 210. The telecommunication switches 204, 206, 208 may implement any suitable telephony protocol including a plain old telephone service (e.g., POTS), a global system for mobile communications (e.g., GSM), and a code division multiple access (CDMA) based telephony protocol. The provider internal network 210 may include any suitable networking component including switches, routers, gateways, and wired and wireless communication connections of any suitable type. The public telephone service provider 202 may provision telephone numbers for suitable telephone service user devices 102, 104, 106, 108, 110 (FIG. 1), for example, utilizing telecommunication switch 204, 206, 208 resources.

The system architecture 200 may further include a grouping service 212 configured at least to provide a telephone number grouping service for the public telephone service provider 202. An example grouping service in accordance with at least one embodiment of the invention is described below in more detail with reference to FIG. 3. In this example system architecture 200, the grouping service 212 is incorporated into the public telephone service provider 202, however each embodiment is not so limited. The grouping service 212 may be accessible from a user client 214 (e.g., a personal computer) via a public internetwork 216 (e.g., the Internet). For example, the grouping service 212 may maintain a web-based user interface for registering and configuring grouped telephone numbers and/or user devices, and the user client 214 may incorporate a web client (e.g., a web browser) suitable for interacting with the web-based user interface.

Figure 3:
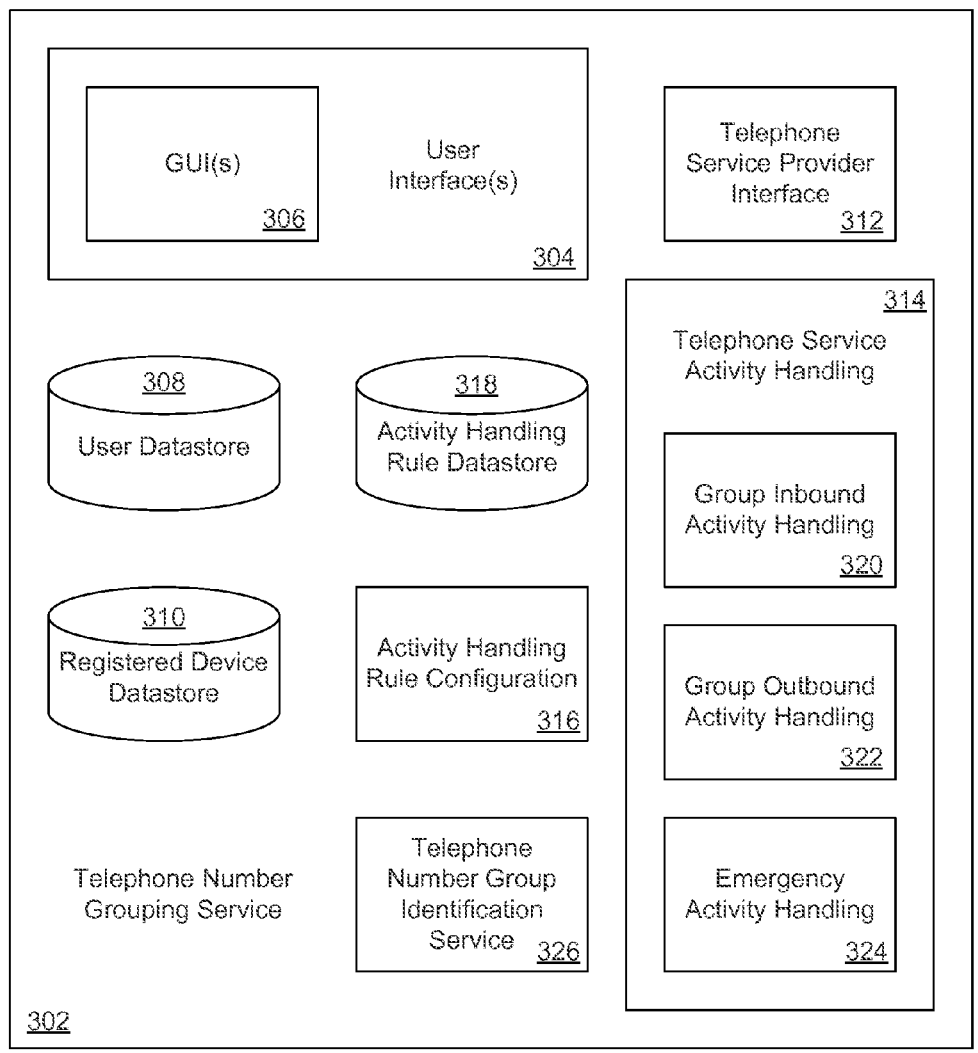
FIG. 3 is a schematic diagram depicting aspects of an example telephone number grouping service in accordance with at least one embodiment of the invention.

FIG. 3 depicts aspects of an example telephone number grouping service 302 in accordance with at least one embodiment of the invention. The telephone number grouping service 302 of FIG. 3 is an example of the grouping service 212 of FIG. 2. The telephone number grouping service 302 of FIG. 3 may include one or more user interfaces 304 suitable for registering and configuring grouped telephone numbers. The user interface(s) 304 may include any suitable user interfaces including one or more interactive voice response (IVR) user interfaces, one or more graphical user interfaces 306 and/or one or more programmatic user interfaces such as one or more application programming interfaces (APIs). grouping service users may utilize suitable telephone service user devices 102, 104, 106, 108, 110 (FIG. 1) and/or other suitable user clients 214 (FIG. 2) to interact with the user interface(s) 304. The user interface(s) 304 may provide access to any suitable functionality of the telephone number grouping service 302, including administrative level access to authorized users.

Service 302 user details and preferences may be stored in a user datastore 308. Registered telephone service user device 102, 104, 106, 108, 110 (FIG. 1) details, including associated telephone numbers, may be stored in a registered device datastore 310. The telephone number grouping service 302 may include a telephone service provider interface 312 enabling access to public telephone service provider 202 (FIG. 2) functionality and/or enabling the public telephone service provider 202 to delegate telephone service activity processing to the telephone number grouping service 302. For example, responsive to registration of a group of telephone numbers, the telephone number grouping service 302 may utilize the telephone service provider interface 312 to request delegation of telephone service activity related to the telephone numbers in the group. Such delegation may include interception and/or forwarding of telephone calls and/or short message service (SMS) messages, and/or delegation of responsibility for aspects of related telephony protocols such as telephony protocol signals or messages. Where a telephone service activity includes distinct service activity control and service activity data aspects, delegation may include delegation of service activity control and/or service activity data. Such delegation may include providing, receiving, routing, transforming and/or processing service activity control and/or service activity data.

Upon receiving delegated telephone service activity, the telephone number grouping service 302 may process the delegated telephone service activity with a telephone service activity handling module 314. For example, the public telephone service provider 202 (FIG. 2) may forward a call destined for a grouped telephone number to the telephone service provider interface 312, and the telephone service activity handling module 314 may process the call in accordance with one or more telephone service activity processing policies. In accordance with at least one embodiment of the invention, telephone service activity processing policies may be at least partially implemented utilizing a rules engine interpreting, processing and/or executing one or more activity handling rules. Such rules may be configured responsive to user selection, for example, by an activity handling rule configuration module 316, and stored in an activity handling rule datastore 318. Activity handling rules may be of any suitable type, including statements of an interpreted or compiled computer programming language. Activity handling rules may specify any suitable telephony protocol state, action and/or parameter, and/or modifications thereof. The telephone service activity handling module 314 may include one or more sub-modules for handling particular types of telephone service activity such as the inbound telephone service activity handling module 320, the outbound telephone service activity handling module 322, and the emergency telephone service activity module 324.

The activity handling rule configuration module 316 may determine sets of one or more rules that implement telephone service activity handling policies including grouped telephone number call policies such as grouped telephone number incoming call policies and grouped telephone number outgoing call policies and similar policies for other types of telephone service activity such as SMS messaging. The telephone number grouping service 302 may incorporate default and/or "hardcoded" telephone service activity handling policies. Alternatively, or in addition, telephone service activity handling policies may be specified and/or customized with one or more user interfaces 304 by a service user and/or administrator. An ordinary service user may customize policies with limited applicability to registered telephone numbers and/or telephone service user devices associated with the user and/or a user group for which the user is authorized to customize policies. A system administrator may create, read, update and delete policies that are applicable to all service 302 users.

For example, a grouped telephone number call policy may specify one or more aspects of telephone number grouping service 302 behavior with respect to telephone calls to or from telephone service user devices associated with grouped telephone numbers. Such policies may control user experience with respect to use of the telephone number grouping service 302. One or more telephone service user devices may be associated with a group of telephone numbers, and a grouped telephone number incoming call policy may specify which of the group of telephone numbers are activated responsive to an incoming call (e.g., are dialed in preparation for participating in the call). Associated telephone service user devices may be activated simultaneously or in a specified order. A grouped telephone number outgoing call policy may specify which of the group of telephone numbers is designated as primary for the group. Calls from any of the telephone service user devices associated with the group may be modified such that the calls appear to originate from the designated primary telephone number of the group. For example, associated "Caller ID" data may be modified to match the designated primary telephone number of the group.

The telephone number grouping service 302 may include a telephone number group identification service 326. The telephone number group identification service 326 may be configured at least to determine one or more telephone number groups with which a particular telephone number and/or registered telephone service user device is associated. For example, a telephone number group data object (e.g., a data object characterizing a telephone number group for programmatic purposes) may include and/or reference a telephone number group identifier, a collection of telephone numbers that are members of the telephone number group and one or more representative telephone numbers (sometimes called "primary" telephone numbers herein) that publically represent the telephone number group in the public telephone network 112 (FIG. 1).

The telephone number group identification service 326 may be utilized by any suitable component of the telephone number grouping service 302 including the user interface(s) 304, the telephone service provider interface 312, the telephone service activity handling component 314 and the activity handling rule configuration component 316. For example, the telephone service activity handling component 314 may provide the telephone number group identification service 326 with a telephone number associated with inbound and/or outbound telephone service activity and receive a telephone group identifier and/or a group representative telephone number in response. Alternatively, or in addition, the telephone number group identification service 326 may be accessed directly by components external to the telephone number grouping service 302, for example, as part of third party integration of applications and/or services utilizing the telephone number groups maintained by the telephone number grouping service 302. The telephone number group identification service 326 may base the determination on data stored in the user datastore 308 and/or the registered device datastore 310.

Figure 4:
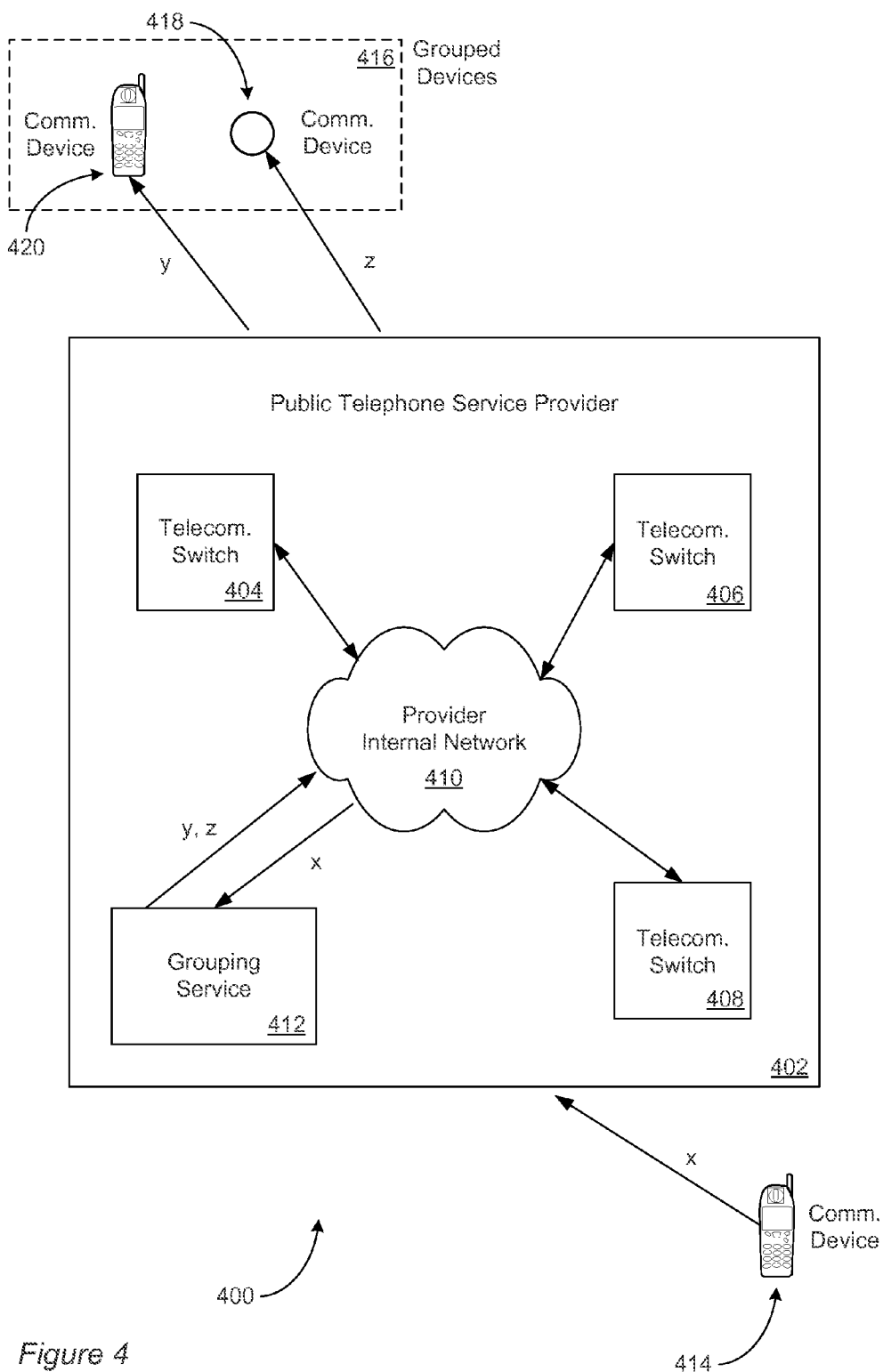
FIG. 4 is a schematic depicting aspects of an example telephony protocol modification in accordance with at least one embodiment of the invention.

FIG. 4 depicts aspects of an example telephony protocol modification 400 in accordance with at least one embodiment of the invention. For example, the telephony protocol modification 400 may be performed by inbound telephone service activity handling module 320 (FIG. 3). A public telephone service provider 402, telecommunication switches 404, 406, 408, provider internal network 410, and grouping service 412 are examples of corresponding components depicted in FIG. 2. Telephone service user device 414 and grouped 416 telephone service user devices 418, 420 are examples of corresponding components depicted in FIG. 1.

In the example depicted in FIG. 4, the devices 420, 418, having telephone numbers y and z, respectively, are registered as grouped devices 416 having primary telephone number x. Primary telephone number x may be a separately provisioned telephone number (e.g., responsive to group registration), or the user may have selected one of telephone numbers y and z to be the primary telephone number (e.g., with user interface(s) 304 of FIG. 3). Device 414 dials primary telephone number x. Public telephone service provider 402 recognizes telephone number x as configured for delegation to the grouping service 412, and forwards the call to the grouping service 412. In response, the grouping service 412 forks the call into two new calls destined for telephone numbers y and z. Answering the call with device 420 or 418 begins the call. During the call, the grouping service 412 may act as a call bridge. Alternatively, or in addition, the grouping service 412 may return call control to the public telephone service provider 402 once the call is established.

Figure 5:
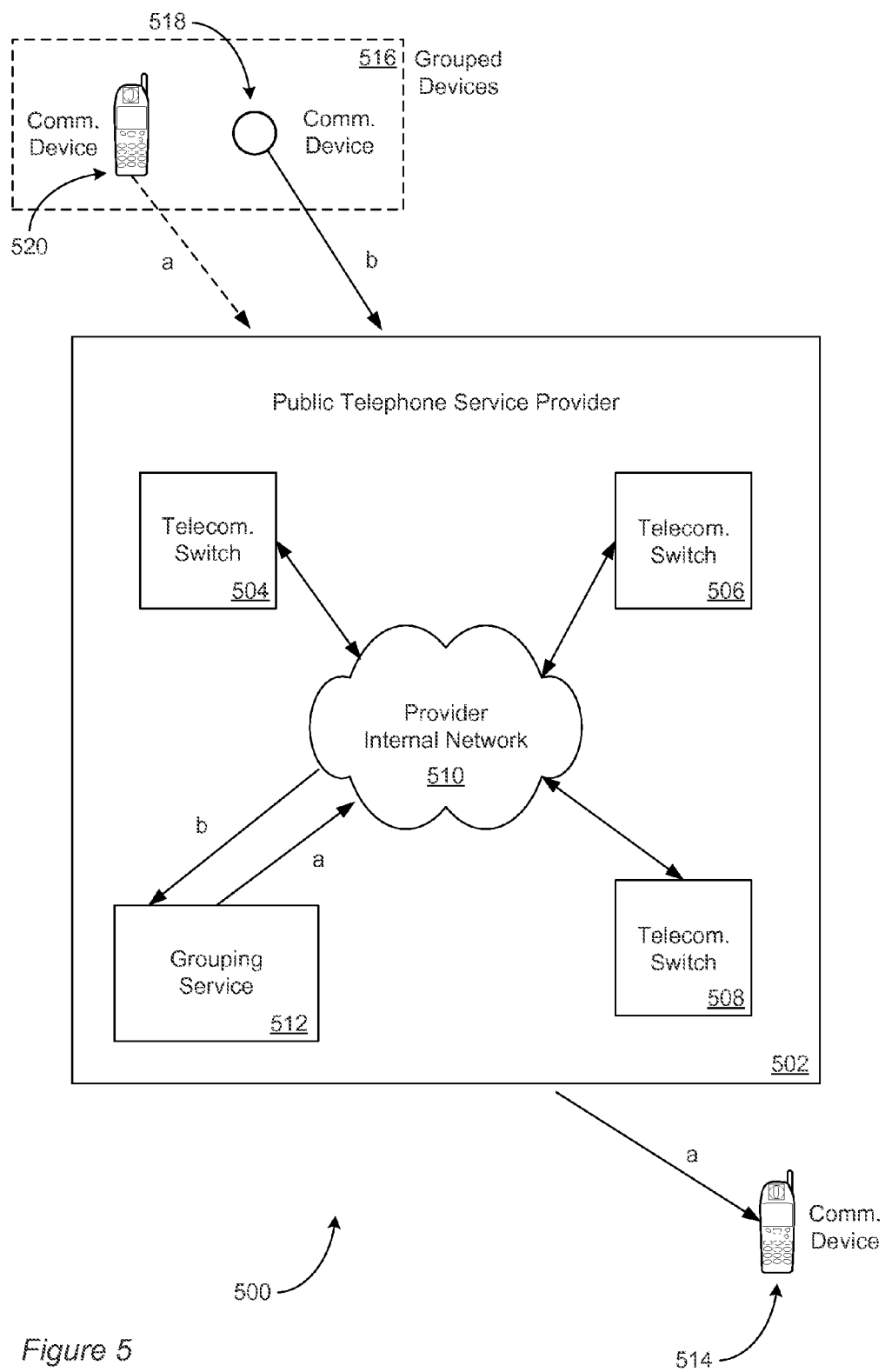
FIG. 5 is a schematic diagram depicting aspects of another example telephony protocol modification in accordance with at least one embodiment of the invention.

FIG. 5 depicts aspects of another example telephony protocol modification 500 in accordance with at least one embodiment of the invention. For example, the telephony protocol modification 500 may be performed by outbound telephone service activity handling module 322 (FIG. 3). A public telephone service provider 502, telecommunication switches 504, 506, 508, provider internal network 510, and grouping service 512 are examples of corresponding components depicted in FIG. 2. Telephone service user device 514 and grouped 516 telephone service user devices 518, 520 are examples of corresponding components depicted in FIG. 1

In the example depicted in FIG. 5, the devices 520, 518, having telephone numbers a and b, respectively, are registered as grouped devices 516 having primary telephone number a. Device 518 originates a call to telephone number c, associated with telephone service user device 514. At this point, the call appears to originate at telephone number b. Public telephone service provider 502 recognizes telephone number b as configured for delegation to the grouping service 512, and forwards the call to the grouping service 512. In response, the grouping service 512 forwards the call to telephone number c, but modifies data associated with the call so that the call appears to originate at the designated primary telephone number a.

Figure 6:
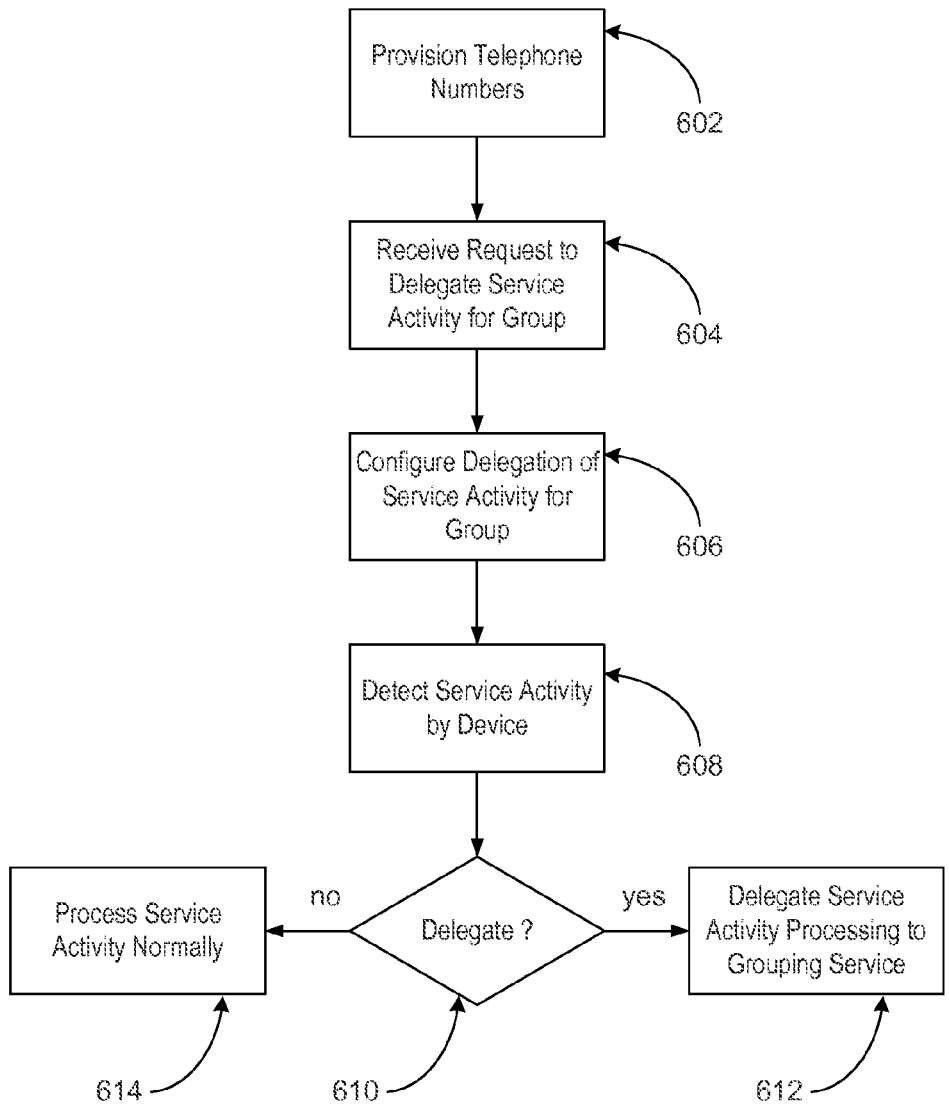
FIG. 6 is a flowchart depicting example steps for providing a telephone number grouping service in accordance with at least one embodiment of the invention.

Having described aspects of suitable telecommunication environments and system architectures, the description now turns to procedures that may be performed therewith. FIG. 6 depicts example steps for providing a telephone number grouping service in accordance with at least one embodiment of the invention. At step 602, one or more telephone numbers may be provisioned, for example, by the public telephone service provider 202 (FIG. 2). At step 604, a request may be received to delegate service activity for a group of telephone numbers. For example, the request may be received from the grouping service 212 responsive to user registration of the group of telephone numbers. At step 606, the requested delegation may be configured. For example, a suitable telecommunication switch 204, 206, 208 may be configured to delegate service activity with respect to telephone numbers in the group of telephone numbers to the grouping service 212.

At step 608, service activity by a telephone service user device may be detected. For example, a telecommunication switch 204, 206, 208 (FIG. 2) may detect an incoming call. At step 610 it may be determined whether the service activity is associated with a telephone number configured for delegation to the grouping service. If so, a procedure including step 610 may progress to step 612. Otherwise, the procedure may progress to step 614. At step 612, service activity processing for the detected service activity may be delegated to the grouping service 212. For example, the incoming call may be forwarded to the grouping service 212. At step 614, the service activity may be processed as normal and/or usual, for example, by the public telephone service provider 202. At times, a procedure performing step 612 may progress to step 614 to resume normal service activity processing. Alternatively, or in addition, service activity processing control may remain delegated for the lifetime of the service activity.

Figure 7:
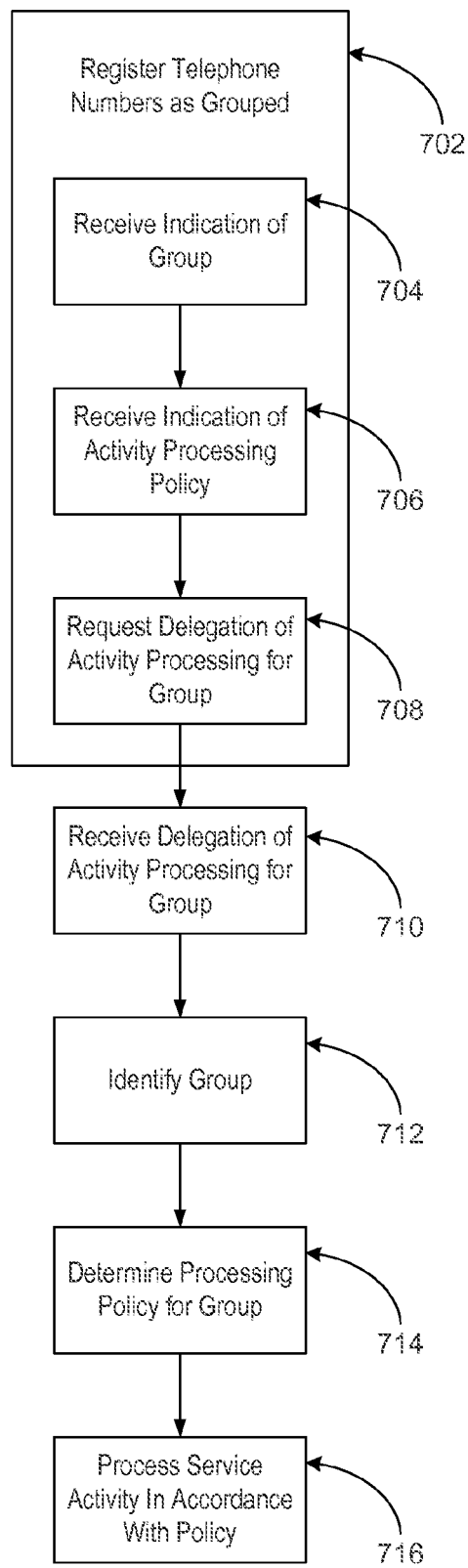
FIG. 7 is a flowchart depicting further example steps for providing a telephone number grouping service in accordance with at least one embodiment of the invention.

FIG. 7 depicts further example steps for providing a telephone number grouping service in accordance with at least one embodiment of the invention. At step 702, two or more telephone numbers may be registered as grouped, for example, with the telephone number grouping service 302 (FIG. 3). Step 702 may itself include one or more steps. For example, steps 704, 706, 708. At step 704, an indication of a group of telephone numbers may be received. For example, the telephone number grouping service 302 may receive a specification of the group of telephone numbers with the user interface(s) 304. At step 706, an indication of a service activity processing policy may be received. For example, the telephone number grouping service 302 may receive an indication of a preferred service activity processing policy with the user interface(s) 304. At step 708, delegation of service activity processing related to telephone numbers in the group may be requested. For example, the telephone number grouping service 302 may request the delegation with the telephone service provider interface 312.

At step 710, delegation of service activity processing related to telephone numbers in the group may be received, for example, with the telephone service provider interface 312 (FIG. 3). At step 712, the group may be identified, for example, by the telephone service activity handling module 314 and/or the telephone number group identification service 326. The identity of the telephone number group may correspond to a representative group telephone number and/or an explicit telephone number group identifier having any suitable form. At step 714, one or more processing policies for the delegated service activity may be determined. For example, the telephone service activity handling module 314 may determine the appropriate policies based at least in part on the identified group (e.g., different policies may be configured for different groups). At step 716, the delegated service activity may be processed in accordance with the determined policy or policies. For example, the telephone service activity handling module 314 may identify and execute a set of rules in the activity handling rule datastore 318 corresponding to the determined policy or policies.

Figure 8:
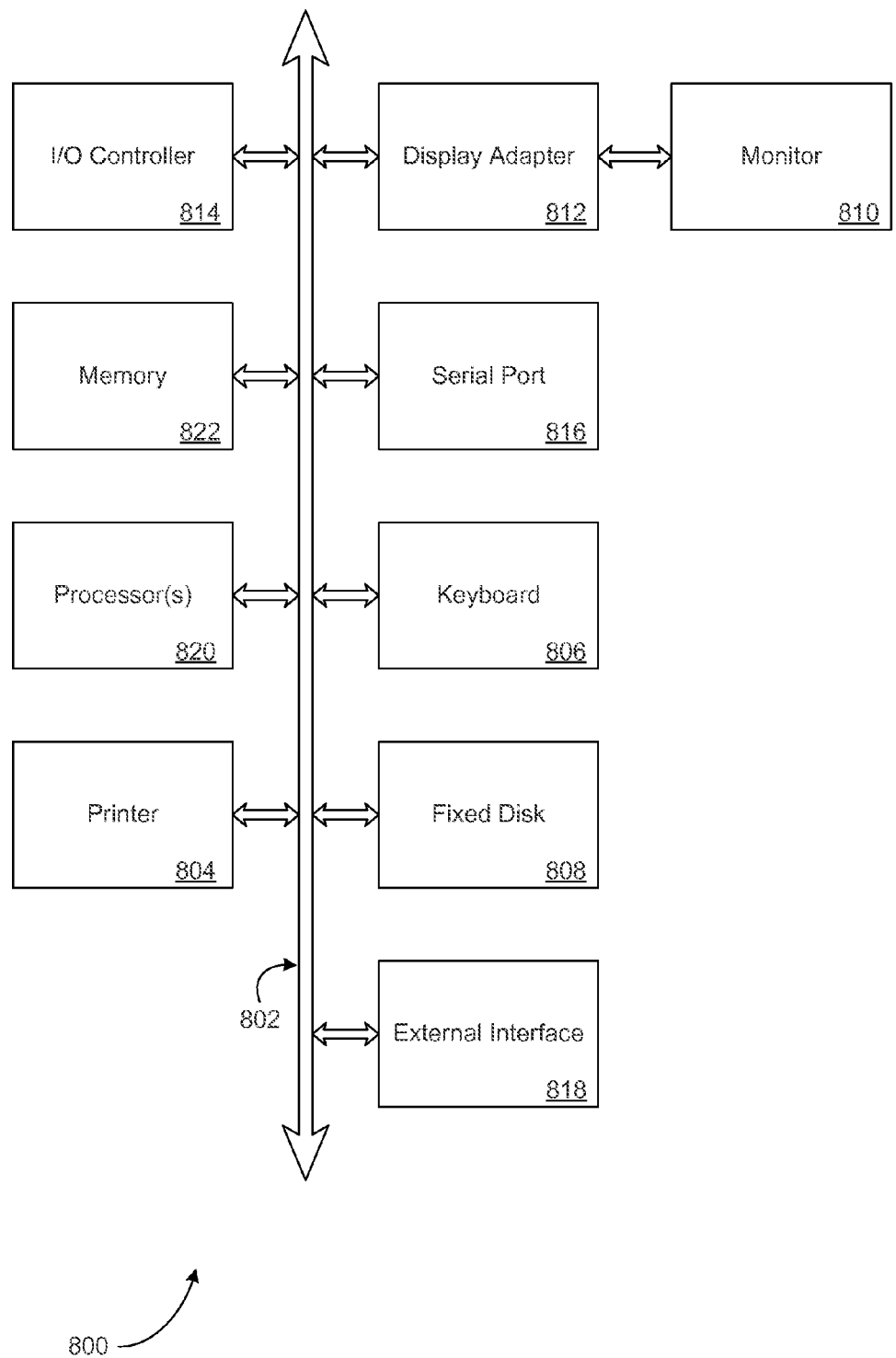
FIG. 8 is a schematic diagram depicting aspects of an example computing device in accordance with at least one embodiment of the invention.

In accordance with at least one embodiment of the invention, the system, apparatus, methods, processes and/or operations described above may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 8 depicts aspects of elements that may be present in a computing device and/or system 800 configured to implement a method and/or process in accordance with some embodiments of the present invention. The subsystems shown in FIG. 8 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system with any number of means known in the art, such as a serial port 816. For example, the serial port 816 or an external interface 818 can be utilized to connect the computing device 800 to further devices and/or systems not shown in FIG. 8 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible, non-transitory computer-readable medium.

Example embodiments in accordance with the invention include the following.

Example 1, a method for telephone number grouping, including: provisioning, by a telephone service provider, a plurality of telephone numbers including associating each of the plurality of telephone numbers with a particular telephone service user device of a plurality of telephone service user devices; registering, with a telephone number grouping service, at least two telephone numbers of the plurality of telephone numbers as grouped telephone numbers with respect to incoming and outgoing telephone calls; providing, by the telephone service provider to the telephone number grouping service, at least partial call control for incoming and outgoing telephone calls with respect to the grouped telephone numbers; with respect to incoming telephone calls, activating one or more of the plurality of telephone service user devices associated with the grouped telephone numbers in accordance with a user-configured grouped telephone number incoming call policy; and with respect to an outgoing telephone call from a telephone service user device associated with the grouped telephone numbers, causing the outgoing telephone call to appear to originate from a selected telephone number of the grouped telephone numbers in accordance with a user-configured grouped telephone number outgoing call policy.

Example 2, a method in accordance with example 1, wherein the telephone service provider comprises the telephone number grouping service. Example 3, a method in accordance with example 1 or 2, wherein each provisioned telephone number is associated with a subscriber identity module (SIM). Example 4, a method in accordance with example 1-2 or 3, wherein the grouped telephone number incoming call policy or the grouped telephone number outgoing call policy is user-configured. Example 5, a method in accordance with example 1-3 or 4, wherein the telephone service provider is one of a plurality of telephone service providers that provision telephone numbers. Example 6, a method in accordance with example 1-4 or 5, wherein the grouped telephone number incoming call policy specifies at least that each of the telephone service user devices associated with the grouped telephone numbers is simultaneously activated in response to an incoming telephone call with respect to any of the grouped telephone numbers. Example 7, a method in accordance with example 1-5 or 6, wherein the telephone number grouping service causes the telephone service provider to provision an additional telephone number associated with the grouped telephone numbers and distinct from each of the at least two registered telephone numbers.

Example 8, a method for telephone service activity processing, including: registering at least two telephone numbers of a plurality of telephone numbers as grouped telephone numbers, the plurality of telephone numbers having been provisioned by a telephone service provider; receiving, from the telephone service provider, at least partial service control for telephone service activity with respect to the grouped telephone numbers; and processing the telephone service activity in accordance with a grouped telephone number call policy such that outgoing service activity appears to originate from a single telephone number and incoming service activity is forwarded to one or more associated telephone service user devices independent of a specified number of the grouped telephone numbers.

Example 9, a method in accordance with example 8, wherein the telephone service activity comprises one or more of: a telephone call, or a short message service (SMS) message. Example 10, a method in accordance with example 8 or 9, wherein receiving at least partial service control comprises one or more of: being delegated responsibility for one or more aspects of a telephony protocol with respect to the telephone service activity, being enabled to modify one or more aspects of a telephony protocol with respect to the telephone service activity, or becoming a service proxy with respect to the telephone service activity.

Example 11, a method in accordance with example 8-9 or 10, wherein receiving at least partial service control comprises one or more of: intercepting a telephone call destined for one or more of the grouped telephone numbers, being forwarded a telephone call destined for one or more of the grouped telephone numbers, intercepting a telephone call originated by one or more of the grouped telephone numbers, being forwarded a telephone call originated by one or more of the grouped telephone numbers. Example 12, a method in accordance with example 8-10 or 11, wherein receiving at least partial service control comprises one or more of: intercepting a short message service (SMS) message destined for one or more of the grouped telephone numbers, being forwarded an SMS message destined for one or more of the grouped telephone numbers, intercepting an SMS message originated by one or more of the grouped telephone numbers, being forwarded an SMS message originated by one or more of the grouped telephone numbers. Example 13, a method in accordance with example 8-11 or 12, wherein processing the telephone service activity comprises one or more of: performing one or more aspects of a telephony protocol with respect to the telephone service activity, modifying one or more aspects of a telephony protocol with respect to the telephone service activity, acting as a service proxy with respect to the telephone service activity, or causing one or more telephone service user devices associated with the grouped telephone numbers to be signaled in accordance with a telephony protocol.

Example 14, a method in accordance with example 8-12 or 13, wherein processing the telephone service activity comprises one or more of: causing a telephone call to be forwarded to one or more telephone service user devices associated with the grouped telephone numbers, or causing a telephone call to be forwarded to each telephone service user device associated with the grouped telephone numbers. Example 15, a method in accordance with example 8-13 or 14, wherein processing the telephone service activity comprises one or more of: causing a short message service (SMS) message to be forwarded to one or more telephone service user devices associated with the grouped telephone numbers, or causing an SMS message to be forwarded to each telephone service user device associated with the grouped telephone numbers. Example 16, a method in accordance with example 8-14 or 15, wherein receiving at least partial service control for the telephone service activity comprises receiving at least partial service control for a telephone call originating from a first telephone number of the grouped telephone numbers and processing the telephone call comprises modifying data associated with the telephone call to cause the telephone call to appear to originate from a second telephone number of the grouped telephone numbers.

Example 17, a system for telephone service activity processing, including: a user interface component configured at least to register at least two telephone numbers of a plurality of telephone numbers as grouped telephone numbers, the plurality of telephone numbers having been provisioned by a telephone service provider; a telephone service provider interface component configured at least to receive, from the telephone service provider, at least partial service control for telephone service activity with respect to the grouped telephone numbers; and a telephone service activity handling component configured at least to process the telephone service activity in accordance with a grouped telephone number call policy such that outgoing service activity appears to originate from a single telephone number and incoming service activity is forwarded to one or more associated telephone service user devices independent of a specified number of the grouped telephone numbers.

Example 18, a system in accordance with example 17, wherein the telephone service provider interface component is communicatively coupled with a telecommunications switch of the telephone service provider. Example 19, a system in accordance with example 17 or 18, wherein the user interface component maintains a graphical user interface configured at least to enable users of the system to specify the at least two telephone numbers to be registered as the grouped telephone numbers. Example 20, a system in accordance with example 17-18 or 19, wherein the user interface component maintains a graphical user interface configured at least to enable users of the system to specify the grouped telephone number call policy for the grouped telephone numbers.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without clear indication to the contrary.

As used herein, the term "alternatively" refers to selection of one of two or more alternatives, and is not intended to limit the selection to only those listed alternatives or to only one of the listed alternatives at a time, unless the context clearly indicates otherwise. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method for telephone number grouping, comprising:
provisioning, by a telephone service provider, a plurality of telephone numbers including associating each of the plurality of telephone numbers with a distinct physical telephone service user device of a grouped plurality of physical telephone service user devices, the quantity of the plurality of telephone numbers being no greater than the quantity of the grouped plurality of physical telephone service user devices;
registering, with a telephone number grouping service, at least two telephone numbers of the plurality of telephone numbers as grouped telephone numbers with respect to incoming and outgoing telephone calls to and from the grouped plurality of physical telephone service user devices;
providing, by the telephone service provider to the telephone number grouping service, at least partial call control for incoming and outgoing telephone calls with respect to the grouped telephone numbers;
with respect to incoming telephone calls to the grouped telephone numbers, activating one or more of the grouped plurality of physical telephone service user devices associated with the grouped telephone numbers in accordance with a grouped telephone number incoming call policy that governs incoming telephone calls to the grouped plurality of physical telephone service user devices, the grouped telephone number incoming call policy being capable of causing activation of multiple of the grouped plurality of physical telephone service user devices responsive to an incoming call; and
with respect to an outgoing telephone call from a physical telephone service user device associated with the grouped telephone numbers, causing the outgoing telephone call to appear to originate from a selected telephone number of the grouped telephone numbers in accordance with a grouped telephone number outgoing call policy that governs outgoing telephone calls from the grouped plurality of physical telephone service user devices, the grouped telephone number outgoing call policy being capable of designating each of the grouped telephone numbers associated with the grouped plurality of physical telephone service user devices as the selected telephone number.

2. A method in accordance with claim 1, wherein the telephone service provider comprises the telephone number grouping service.

3. A method in accordance with claim 1, wherein each provisioned telephone number is associated with a subscriber identity module (SIM) of the distinct physical telephone service user device.

4. A method in accordance with claim 1, wherein the grouped telephone number incoming call policy or the grouped telephone number outgoing call policy is user-configured.

5. A method in accordance with claim 1, wherein the plurality of telephone numbers are initially provisioned such that each telephone number of the plurality of telephone numbers corresponds to exactly one physical telephone service user device of the grouped plurality of physical telephone service user devices.

6. A method in accordance with claim 1, wherein a single owner of the grouped plurality of physical telephone service user devices specifies the grouped telephone number incoming call policy and the grouped telephone number outgoing call policy.

7. A method in accordance with claim 1, wherein the outgoing telephone call appears to originate from the selected telephone number independent of which of the grouped plurality of physical telephone service user devices is used to originate the outgoing telephone call.

8. A method for telephone service activity processing, comprising:
   registering at least two telephone numbers of a plurality of telephone numbers as grouped telephone numbers, the plurality of telephone numbers having been provisioned by a telephone service provider as each associated with a distinct physical telephone service user device of a grouped plurality of physical telephone service user devices, the quantity of the plurality of telephone numbers being no greater than the quantity of the grouped plurality of physical telephone service user devices;
   receiving, from the telephone service provider, at least partial service control for telephone service activity with respect to the grouped telephone numbers; and
   processing the telephone service activity in accordance with a grouped telephone number call policy that governs telephone calls to and from the grouped plurality of physical telephone service user devices such that outgoing service activity appears to originate from a single telephone number of the grouped telephone numbers and incoming service activity directed to a specified telephone number of the grouped telephone numbers is forwarded to one or more associated physical telephone service user devices independent of the specified telephone number of the grouped telephone numbers, wherein the grouped telephone number call policy is capable of causing activation of multiple of the grouped plurality of physical telephone service user devices responsive to incoming service activity and is capable of designating each of the grouped telephone numbers associated with the grouped plurality of physical telephone service user devices as the specified telephone number.

9. A method in accordance with claim 8, wherein the telephone service activity comprises one or more of: a telephone call, or a short message service (SMS) message.

10. A method in accordance with claim 8, wherein receiving at least partial service control comprises one or more of: being delegated responsibility for one or more aspects of a telephony protocol with respect to the telephone service activity, being enabled to modify one or more aspects of a telephony protocol with respect to the telephone service activity, or becoming a service proxy with respect to the telephone service activity.

11. A method in accordance with claim 8, wherein receiving at least partial service control comprises one or more of: intercepting a telephone call destined for one or more of the grouped telephone numbers, being forwarded a telephone call destined for one or more of the grouped telephone numbers, intercepting a telephone call originated by one or more of the grouped telephone numbers, being forwarded a telephone call originated by one or more of the grouped telephone numbers.

12. A method in accordance with claim 8, wherein receiving at least partial service control comprises one or more of: intercepting a short message service (SMS) message destined for one or more of the grouped telephone numbers, being forwarded an SMS message destined for one or more of the grouped telephone numbers, intercepting an SMS message originated by one or more of the grouped telephone numbers, being forwarded an SMS message originated by one or more of the grouped telephone numbers.

13. A method in accordance with claim 8, wherein processing the telephone service activity comprises one or more of: performing one or more aspects of a telephony protocol with respect to the telephone service activity, modifying one or more aspects of a telephony protocol with respect to the telephone service activity, acting as a service proxy with respect to the telephone service activity, or causing one or more telephone service user devices associated with the grouped telephone numbers to be signaled in accordance with a telephony protocol.

14. A method in accordance with claim 8, wherein processing the telephone service activity comprises one or more of: causing a telephone call to be forwarded to one or more telephone service user devices associated with the grouped telephone numbers, or causing a telephone call to be forwarded to each telephone service user device associated with the grouped telephone numbers.

15. A method in accordance with claim 8, wherein processing the telephone service activity comprises one or more of: causing a short message service (SMS) message to be forwarded to one or more telephone service user devices associated with the grouped telephone numbers, or causing an SMS message to be forwarded to each telephone service user device associated with the grouped telephone numbers.

16. A method in accordance with claim 8, wherein receiving at least partial service control for the telephone service activity comprises receiving at least partial service control for a telephone call originating from a first telephone number of the grouped telephone numbers and processing the telephone call comprises modifying data associated with the telephone call to cause the telephone call to appear to originate from a second telephone number of the grouped telephone numbers.

17. A system for telephone service activity processing, comprising:
   a user interface component configured at least to register at least two telephone numbers of a plurality of telephone numbers as grouped telephone numbers, the plurality of telephone numbers having been provisioned by a telephone service provider as each associated with a distinct physical telephone service user device of a grouped plurality of physical telephone service user devices, the quantity of the plurality of telephone numbers being no greater than the quantity of the grouped plurality of physical telephone service user devices;
   a telephone service provider interface component configured at least to receive, from the telephone service provider, at least partial service control for telephone service activity with respect to the grouped telephone numbers; and a telephone service activity handling component configured at least to process the telephone service activity in accordance with a grouped telephone number call policy that governs telephone calls to and from the grouped plurality of physical telephone service user devices such that outgoing service activity appears to originate from a single telephone number of the grouped telephone numbers and incoming service activity directed to a specified telephone number of the grouped telephone numbers is forwarded to one or more associated physical telephone service user devices independent of the specified telephone number of the grouped telephone numbers, wherein the grouped telephone number call policy is capable of causing activation of multiple of the grouped plurality of physical telephone service user devices responsive to incoming service activity and is capable of designating each of the grouped telephone numbers associated with the grouped plurality of physical telephone service user devices as the specified telephone number.

18. A system in accordance with claim 17, wherein the telephone service provider interface component is communicatively coupled with a telecommunications switch of the telephone service provider.

19. A system in accordance with claim 17, wherein the user interface component maintains a graphical user interface configured at least to enable users of the system to specify the at least two telephone numbers to be registered as the grouped telephone numbers.

20. A system in accordance with claim 17, wherein the user interface component maintains a graphical user interface configured at least to enable users of the system to specify the grouped telephone number call policy for the grouped telephone numbers.

\* \* \* \* \*